(12) United States Patent
Fukuyoshi

(10) Patent No.: US 6,513,943 B2
(45) Date of Patent: Feb. 4, 2003

(54) BACKLIGHT UNIT AND DISPLAY DEVICE USING THE SAME BACKLIGHT UNIT

(75) Inventor: Hirokazu Fukuyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 3 days.

(21) Appl. No.: 09/810,542

(22) Filed: Mar. 19, 2001

(65) Prior Publication Data

US 2001/0030859 A1 Oct. 18, 2001

(30) Foreign Application Priority Data

Mar. 24, 2000 (JP) .......................................... 2000-84622

(51) Int. Cl.[7] .................................................. F21V 7/04
(52) U.S. Cl. ........................... 362/31; 362/330; 362/29; 359/599
(58) Field of Search .................... 362/31, 561, 330, 362/331, 29; 359/599

(56) References Cited

U.S. PATENT DOCUMENTS 4,920,298 A  *  4/1990  Hinotani et al. ............ 313/493
5,381,309 A     1/1995  Borchardt
5,619,351 A  *  4/1997  Funamoto .................... 349/61
5,852,514 A  * 12/1998  Toshima et al. ............. 359/599

FOREIGN PATENT DOCUMENTS

| DE | 297 00 485 | 3/1998 |
| GB | 2 149 657 | 6/1985 |
| JP | 59-52217 | 3/1984 |
| JP | 2856276 | 11/1998 |

* cited by examiner

Primary Examiner—Sandra O'Shea
Assistant Examiner—Ali Alavi
(74) Attorney, Agent, or Firm—Young & Thompson

(57) ABSTRACT

In a backlight unit including an illumination member such as a light guide panel equipped with a line-shaped light source and a light diffusing optical sheet or a light collecting optical sheet arranged on the light guide panel, a reinforcing plate having light transmittance higher than that of the optical sheet and resistive against thermal deformation is stuck on at least one of these optical sheet to restrict thermal deformation of the optical sheet.

18 Claims, 3 Drawing Sheets

BACKLIGHT UNIT AND DISPLAY DEVICE USING THE SAME BACKLIGHT UNIT

BACKGROUND OF THE INVENTION

1. Field of the Invention

The present invention relates to a display device and a backlight unit for use in the display device and, particularly, to a structure of a flat emission type backlight unit having a line-shaped light source.

2. Description of the Prior Art

The non-light emission type display device such as, for example, a liquid crystal display device is usually equipped with a flat light emission type backlight unit in order to make a display possible even in a place in which there is no external light or a state of an external light is inadequate. A general structure of such liquid crystal display device will be described with reference to FIG. 1.

As shown in FIG. 1, a backlight unit 10 for a liquid crystal display device includes a line-shaped light source 2 such as a cold cathode fluorescent lamp arranged on a side surface of a light guide panel 1 and a light reflection plate 3 for reflecting light from the light source 2 to the light guide panel 1. A reflection sheet 5 is arranged on a rear surface of the light guide panel 1. The line-shaped light source 2 is connected to a connector terminal 32 through lead wires 33. A light collecting optical sheet 41 such as a prism sheet is arranged on the surface side of the light guide panel 1 and a light diffusing optical sheet 42 is provided between the light collecting optical sheet 41 and the light guide panel 1. These components are housed in a housing 6 to form the back light unit 10.

A liquid crystal display panel 11 is provided on the housing 6 and the liquid crystal display device is completed by sandwiching the housing 6 between an upper shield 12 and a lower shield 13 and fixing the shields 12 and 13 to the housing 6. The fixing of the shields 12 and 13 to the housing is performed by using known fixing means such as threads and screws or detents and notches.

FIG. 2 is a cross section of the backlight unit 10, which is of, for example, an edge illuminating type. The light guide panel 1 is formed of a resin material such as acrylic resin having high light transmittance and takes in the form of a flat panel. The line-shaped light source 2 is arranged along a side edge of the light guide panel 1 and the light guide panel 1 functions to randomly reflect light incident on the side edge thereof from the light source 2 within the light guide panel. The light reflection plate 3 having a U-shaped cross section is arranged on an opposite side of the light source 2 to the side facing the side edge of the light guide panel 1 to cover the line-shaped light source 2 such that light from the light source 2 is efficiently introduced into the side edge of the light guide panel 1. The reflection sheet 5 for reflecting back light coming through a lower surface of the light guide panel 1 toward a front, that is, upper surface thereof is arranged on the lower, that is, rear surface of the light guide plate 1. The light diffusing optical sheet 42 and the light collecting optical sheet 41 are laminated on the side of the upper surface of the light guide panel 1 and the assembly is housed in the housing 6.

Each of these optical sheets is as thin as 0.12 mm and a base material thereof is usually polyester resin. Since, in such case, light transmittance of one sheet is about 90%, the sheet has to be made as thin as possible, otherwise, light transmittance thereof is lowered.

When the backlight unit including such thin optical sheets is assembled together with a non-light emitting display device and operated in high temperature and high humidity environment or in low temperature environment, the light collecting and light diffusing optical sheets of the backlight unit are not only thermally expanded but also thermally deformed, resulting in wrinkles or flexion of the optical sheets. Therefore, the uniformity of luminance is degraded. Particularly, in a case where peripheries of the optical sheets are pressed to the light guide panel in the frame type housing 6 and fixed thereto, wrinkle or bending appears in center portions of the sheets, so that the display quality of the display device is degraded. Even if the optical sheets are not pressed by the frame and fixed thereto, it is necessary to provide a large clearance between the frame and the optical sheets in order to avoid interference between the housing frame and the optical sheets. However, it is difficult to provide large clearance in the backlight unit in view of the commercial request of reducing the size and thickness of the display device. Therefore, the problem of degradation of display quality due to thermal deformation of the optical sheets cannot be solved.

Although techniques for compensating for a shortage of strength of a reflecting/deflecting plate and/or a light guide panel are disclosed in, for example, Japanese Patent Application Laid-open No. S59-52217 and Japanese Patent No. 2856276, these techniques are not related to the reinforcement of optical sheets used in a backlight unit, for diffusing light, collecting light and/or reflecting light, as in the present invention.

SUMMARY OF THE INVENTION

An object of the present invention is to provide a backlight unit for use in a non-light emitting type display device such as a liquid crystal display device, which backlight unit includes a thin optical sheet as a light diffuser, a light collector or a light reflector and a reinforcing plate stuck on the optical sheet and having light transmittance higher than that of the one sheet and durability against thermal deformation so that luminance of the backlight unit becomes uniform without irregularity in high temperature and high humidity environment.

Another object of the present invention is to provide a display device using the same backlight unit.

According to the present invention, a backlight unit comprises an optical sheet for transmitting light from a light source and giving an optical change to the light, a transparent reinforcing plate in intimate contact with one of main surfaces of the optical sheet and a reflection member for reflecting the light emitted from the light source to the transparent reinforcing plate such that the light from the light source passed through the transparent reinforcing plate passes through the optical sheet.

The transparent reinforcing plate is preferably formed of a material having light transmittance higher than that of the optical sheet and thermal deformation larger than that of the optical sheet.

The optical sheet is a light collecting optical sheet for increasing a front surface luminance of the backlight unit and the backlight unit further comprises a light diffusing optical sheet arranged on a side of a surface of the reinforcing plate opposite to the side of the other surface thereof on which the light collecting optical sheet is arranged, for increasing the uniformity of luminance of a light emitting surface of the backlight unit and a flat light guide panel arranged between the reflecting member and the light diffusing optical sheet for randomly reflecting the incident light from the light source, within the flat light guide plate.

The light source is a line-shaped light source arranged on a side edge of the light guide panel and the backlight unit further comprises a curved light reflecting plate for reflecting light emitted from the light source toward the side edge of the light guide panel.

The reinforcing plate is preferably stuck on the optical sheet by a transparent tackiness agent. The transparent tackiness agent may be acrylic tackiness agent.

In a case where a base material of the optical sheet is polyester resin, the reinforcing plate is preferably formed of either polyethylene naphthalate resin or polycarbonate.

Particularly, light transmittance of the reinforcing plate for light from the light source is preferably 90% or more.

Glass transition temperature of the reinforcing plate is preferably 100° C. or higher.

Furthermore, according to the present invention, a liquid crystal display device including the above mentioned backlight unit arranged on a rear surface of a liquid crystal display panel is provided.

In a case where the backlight unit is of the light-up type to be used below the liquid crystal display panel, the optical sheet is a light diffusing optical sheet for increasing the uniformity of luminance of the light-emitting surface of the backlight unit. The light source may be arranged immediately below the reinforcing plate and between the reflecting member and the reinforcing plate. In such case, the light source preferably comprises a plurality of juxtaposed line-shaped light sources and the reflecting member is preferably constructed with a support plate and a white reflecting plate supported by the support plate.

According to another aspect of the present invention, the backlight unit comprising a flat light guide panel for randomly reflecting incident light, which is emitted from a line light source arranged on a side edge of the flat light guide panel, within the flat light guide panel, a reflecting plate provided on one of major surfaces of the light guide panel, for reflecting light toward the side of the other major surface, a light diffusing optical sheet provided on the side of the other major surface of the light guide panel, for improving uniformity of luminance of a light emitting surface of the backlight unit, a light collecting optical sheet for improving luminance of a front surface of the backlight unit, a housing for housing the flat light guide panel, the reflecting plate, the light diffusing optical sheet and the light collecting optical sheet is featured by further comprising a transparent reinforcing plate in intimate contact with at least one of the light diffusing optical sheet and the light collecting optical sheet.

According to a further aspect of the present invention, the backlight unit comprising at least one line-shaped light source, a white reflecting plate for reflecting light emitted backward from the line-shaped light source and a light diffusing optical sheet for improving uniformity of luminance of a light emitting surface of light directly emitted from the line-shaped light source or reflected light by the white reflecting plate, is featured by further comprising a transparent reinforcing plate provided on a rear surface of the light diffusing optical sheet, which is a surface opposite to a beaded surface of the light diffusing optical sheet.

The reinforcing plate is formed of polyethylene naphthalate or polycarbonate having mechanical strength higher than that of the light diffusing optical sheet.

According to another aspect of the present invention, a non-light emitting type display device, which comprising a backlight unit and a liquid crystal display provided on the backlight unit and displays an image with light emitted from the backlight unit, is featured by that the backlight unit is the above mentioned back light.

BRIEF DESCRIPTION OF THE DRAWINGS

The above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

Figure 1:
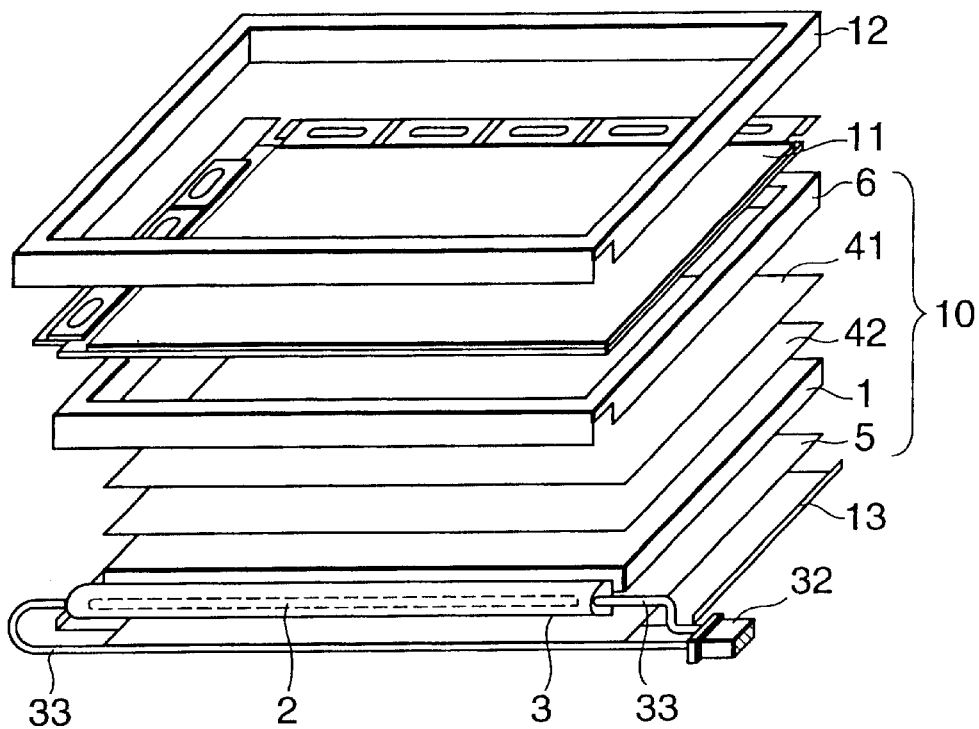
FIG. 1 is a disassembled perspective view of a conventional non-light emitting type display device.
Figure 2:
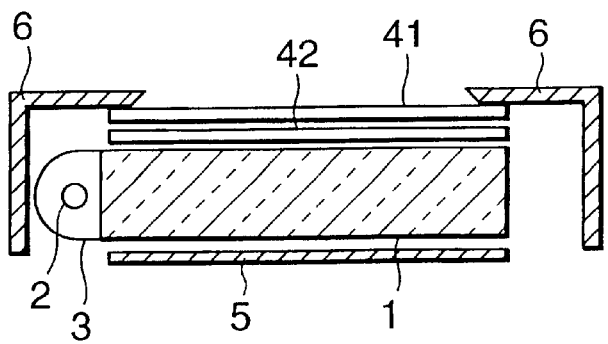
FIG. 2 is a cross section of a backlight unit used in the conventional display device.
Figure 3:
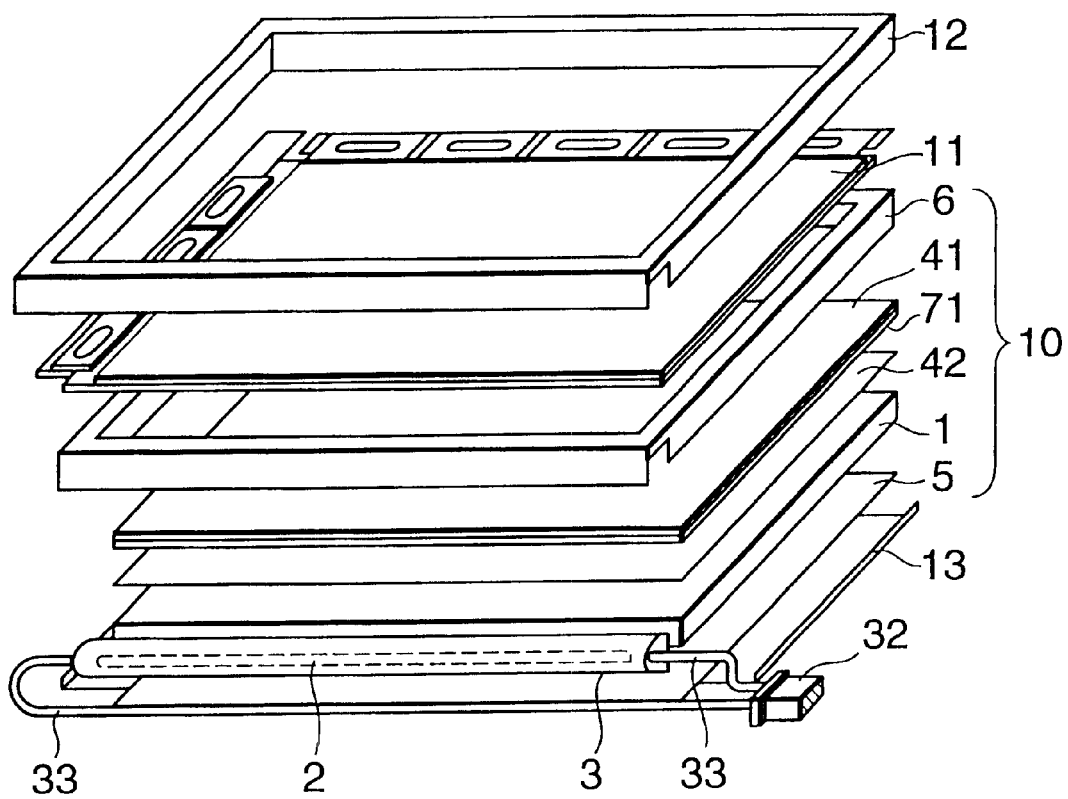
FIG. 3 is a disassembled perspective view of a display device according to the first embodiment of the present invention.

The present invention will be described in detail with reference to the drawings. FIG. 3 is a disassembled perspective view of a display device according to the first embodiment of the present invention. In FIG. 3, a line-shaped light source 2 is provided along a side edge of a light guide panel 1 and the line-shaped light source 2 is partially covered by a light reflecting plate 3. The line-shaped light source 2 is connected to a connector terminal 32 through lead lines 33. A reflecting sheet 5 is provided on one of major surfaces of the light guide plate 1, for reflecting light toward the other major surface thereof. On the other hand, a diffusing optical sheet 42 and a collecting optical sheet 41 are provided on the side of the other major surface of the light guide panel 1. A backlight unit 10 is formed by these components housed in a housing 6. The light collecting optical sheet 41 is stuck with a transparent reinforcing plate 71 of a material, which is resistive to thermal deformation. A liquid crystal display panel 11 is arranged above the backlight unit 10 and a front shield 12 is put on the liquid crystal display panel 11. A rear shield 13 is arranged on a lower surface of the backlight unit 10. These components are fitted in the housing 6 below the liquid crystal display panel 11, completing the display device. In FIG. 3, although the reinforcing plate 71 is stuck on only the light collecting optical sheet 41, it is possible to stick reinforcing plates on both the light collecting optical sheet 41 and the light diffusing optical sheet 42.

Figure 4:
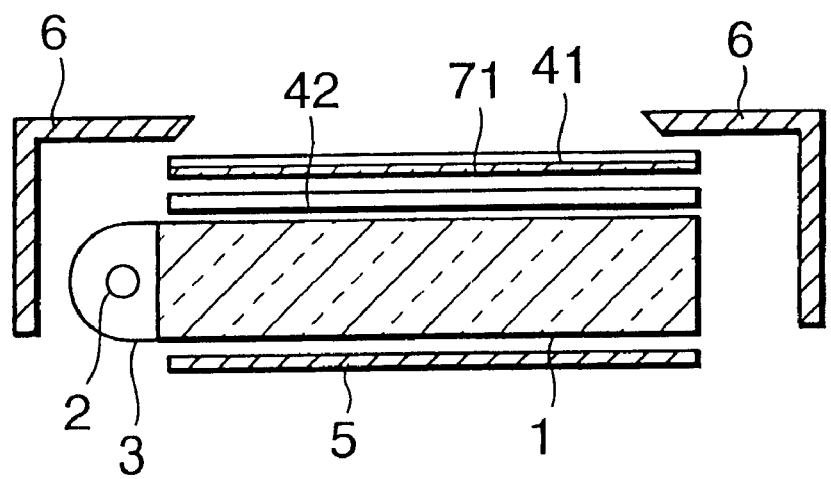
FIG. 4 is a cross section of a backlight unit used in the display device shown in FIG. 3.

FIG. 4 is a cross section of the backlight unit of the present invention. The line-shaped light source 2 is arranged on a side edge of the flat light guide panel 1, which is formed of a resin such as acrylic resin having high light transmittance and functions to randomly reflect light incident on the side edge within the light guide panel 1. As the line-shaped light source, a fluorescent lamp such as a hot cathode tube or a cold cathode tube is usually used. In order to efficiently guide light emitted from the line-shaped light source 2 to the light guide panel 1, the line-shaped light source 2 is partially covered by a light reflecting plate 3. A reference numeral 5 depicts a reflecting sheet arranged on one of major surfaces of the light guide panel 1 for reflecting light toward the other major surface.

The light diffusing optical sheet 42 for improving uniformity of luminance of the light emitting surface and the light collecting optical sheet 41 for improving luminance of the front surface are arranged on the display side of the light guide panel 1. One surface of the light collecting optical sheet 41 is in intimate contact with a reinforcing plate 71 formed of a material having high light transmittance and having higher resistivity against thermal deformation than that of the optical sheets, that is, a material having glass transition temperature higher than that of the optical sheets.

Since glass transition temperature of polyester resin, which is a general material of the optical sheets, is about 80° C., the material of the reinforcing plate 71 preferably has glass transition temperature of 100° C. or higher. For example, polyethylene naphthalate has glass transition temperature as high as about 120° C. and light transmittance as high as about 90% in a case where the thickness of the plate formed of polyethylene naphthalate is 0.2 mm. Therefore, polyethylene naphthalate is preferable as the material of the reinforcing plate in the present invention. Alternatively, polycarbonate is also suitable as the material of the reinforcing plate.

The reinforcing plate 71 is stuck on a whole area of on the major surface of the light collecting optical sheet 41 by a tackiness agent such as acrylic tackiness agent having high light transmittance. In doing so, it is preferable to form the reinforcing plate of a material having coefficient of linear expansion close to that of the optical sheet. Since coefficient of linear expansion of polyester resin is $1.5 \sim 4.5 \times 10^{-5}$, polyethylene naphthalate having coefficient of linear expansion of $1.0 \times 10^{-6} \sim 6 \times 10^{-5}$ is preferable as the material of the reinforcing plate.

Although the case where the reinforcing plate is stuck on only the light collecting optical sheet 41 is shown in FIG. 4, it is possible to stick another reinforcing plate on the light diffusing optical sheet 42 as well. Since it is usual, for the purpose of light collection or light diffusion, that one surface of the light collecting optical sheet 41 as well as the light diffusing optical sheet 42 is formed with prisms or a bead coat, the reinforcing plate is stuck on the other surface of the optical sheet having no such prisms or bead coat.

When a display device is operated in high temperature and high humidity environment, an optical sheet formed of resin is expanded. In such case, if a clearance between a frame formed of ABS resin or aluminum for housing and protecting a backlight unit and the optical sheet is small, the frame and the optical sheet interfere each other and the optical sheet may be warped or wrinkled. However, by sticking the reinforcing plate having high light transmittance and resistive to thermal deformation on such optical sheet, it is possible to prevent the optical sheet from being deformed in high temperature and high humidity environment or in low temperature environment without degrading the effect of the optical sheet to thereby obtain a backlight unit having uniform luminance.

According the experiment conducted by the present inventors with using an optical sheet combined with a reinforcing plate of polyethylene naphthalate, it has been confirmed that coefficient of linear expansion of the combined optical sheet and the reinforcing plate obtained by leaving the combined optical sheet and the reinforcing plate as they are for 240 hours in an environment of temperature of 60° C. and humidity of 80% and then for 24 hours in an environment of normal temperature of 25° C. and humidity of 60% or lower is $0.3 \sim 0.9 \times 10^{-5}$.

Although the thicker the reinforcing plate provides the higher the effect of preventing deformation of the optical sheet, light transmittance of the latter is lowered correspondingly. Therefore, the reinforcing plate is preferably thicker than the optical sheet and has light transmittance not lower than 90%. When the reinforcing plate is formed of polyethylene naphthalate, the thickness thereof is preferably in a range from 0.15 mm to 0.5 mm and, more preferably, in a range from 0.2 mm to 0.3 mm in view of practical balance between mechanical strength and light transmittance thereof.

It may be possible to increase the strength of the optical sheet by making the latter thicker. However, a sheet of polyester resin, which is suitable as a material for the optical sheet, 0.12 mm thick has light transmittance as low as about 90%. If the thickness thereof is increased further more in order to obtain a desired mechanical strength, light transmittance thereof is substantially lowered to a level, which can not be accepted practically.

Figure 5:
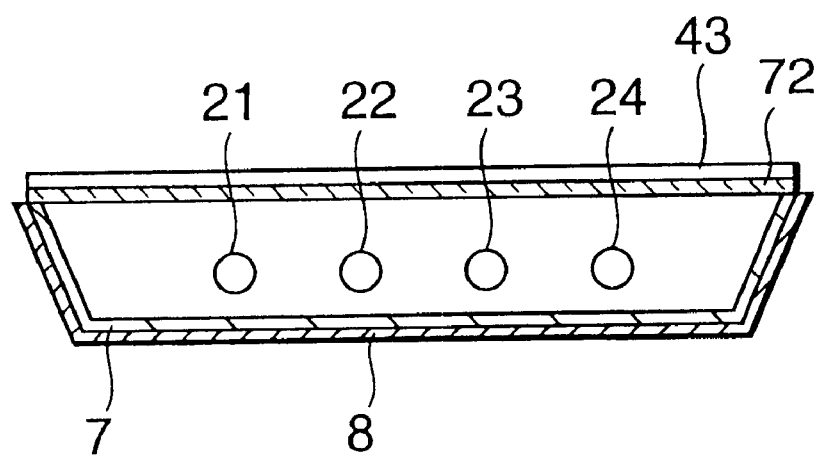
FIG. 5 is a cross section of a backlight unit according to the second embodiment of the present invention.

Next, the second embodiment of the present invention will be described with reference to FIG. 5. The second embodiment is an example of a backlight unit of the light-up type. A plurality of line-shaped light sources 21 to 24 such as fluorescent lamps are juxtaposed between a white reflecting plate 7 and a light diffusing optical sheet 43. The white reflecting plate 7 is supported by a support plate 8 and reflects lights from the line-shaped light sources 21 to 24 in one direction. The light diffusing optical plate 43 is provided to make luminance of lights from the line-shaped light sources uniform. Furthermore, a transparent reinforcing plate 72 is stuck on a rear surface of the light diffusing optical sheet 43 (opposite to a beaded surface thereof) by using a tackiness agent. It is preferable, as mentioned previously, that the reinforcing plate is formed of a material having mechanical strength higher than that of the light diffusing optical sheet, that is, higher resistivity against deformation than that of the light diffusing optical sheet, such as, for example, polyethylene naphthalate or polycarbonate. As another material of the reinforcing plate, which can be applied, is a thin and low-density glass material. Portions of the light diffusing optical sheet 43 arranged in the vicinity of the line-shaped light sources 21 to 24 and having no reinforcing plate located immediately above the line-shaped light sources are expanded by heat generated by the light sources, causing local wrinkles to be occur. However, by using the reinforcing plate 72 stuck on the light diffusing optical sheet as in this embodiment, it is possible to restrict generation of wrinkles in the optical sheet.

As described in detail hereinbefore, according to the present invention, it is possible to restrict deformation of an optical sheet by sticking a reinforcing plate having mechanical strength resistive to deformation due to expansion of the optical sheet under high temperature and high humidity environment or shrinkage under low temperature environment on the optical sheet. Furthermore, according to the present invention, it is possible to make a clearance between the optical sheet and a frame for housing the optical sheet small compared with the conventional backlight unit, so that the size of the backlight unit can be reduced. Therefore, a compact and thin display device can be provided.

Although the display device having a liquid crystal display panel has been described, the backlight unit of the present invention can be employed in an electric sign or an electric billboard of the type lighted up from a back side.

What is claimed is:

1. A backlight unit comprising:
   a light source;
   an optical sheet for transmitting light from said light source and giving an optical change to the light;

a transparent reinforcing plate in intimate contact with a major surface of said optical sheet; and a reflection member for reflecting the light emitted from said light source to said transparent reinforcing plate such that the light from said light source passed through said transparent reinforcing plate passes through said optical sheet, wherein said light source is arranged immediately below said reinforcing plate and between said reflecting member and said reinforcing plate.

2. A backlight unit as claimed in claim 1, wherein said transparent reinforcing plate is formed of a material having light transmittance and glass transition temperature higher than those of said optical sheet.

3. A backlight unit as claimed in claim 1, wherein, said optical sheet is a light collecting optical sheet for increasing a front surface luminance of said backlight unit, and further comprising a light diffusing optical sheet arranged on a side of a surface of said reinforcing plate opposite to the side of the other surface thereof on which said light collecting optical sheet is arranged, for increasing the uniformity of luminance of a light emitting surface of said backlight unit, and a flat light guide panel arranged between said reflecting member and said light diffusing optical sheet for randomly reflecting the incident light from said light source, within said flat light guide panel.

4. A backlight unit comprising:

a reflecting member constructed with a support plate;

a reflecting plate supported by said support plate;

a light source comprising a plurality of juxtaposed line-shaped light sources;

an optical sheet for transmitting light from the light source and giving an optical change to the light;

a transparent reinforcing plate in intimate contact with a major surface of said optical sheet; and the reflection member for reflecting the light emitted from said light source to said transparent reinforcing plate such that the light from said light source passed through said transparent reinforcing plate passes through said optical sheet, wherein said light source is arranged immediately below said reinforcing plate and between said reflecting member and said reinforcing plate.

5. A backlight unit as claimed in claim 1, wherein said reinforcing plate is stuck on said optical sheet by a transparent tackiness agent.

6. A backlight unit as claimed in claim 5, wherein said transparent tackiness agent is acrylic tackiness agent.

7. A backlight unit as claimed in claim 1, wherein a base material of said optical sheet is polyester resin and said reinforcing plate is formed of either polyethylene naphthalate resin or polycarbonate.

8. A backlight unit as claimed in claim 1, wherein light transmittance of said reinforcing plate for light from said light source is 90% or more.

9. A backlight unit as claimed in claim 1, wherein glass transition temperature of said reinforcing plate is 100° C. or higher.

10. A liquid crystal display device comprising a liquid crystal display panel and a backlight unit claimed in claim 1, wherein said backlight unit is arranged on a rear surface of said liquid crystal display panel integrally.

11. The unit of claim 4, wherein said reflecting plate is a white reflecting plate.

12. A backlight unit comprising:

an optical sheet for transmitting light from a light source and giving an optical change to the light;

a transparent reinforcing plate in intimate contact with a major surface of said optical sheet; and a reflection member for reflecting the light emitted from said light source to said transparent reinforcing plate such that the light from said light source passed through said transparent reinforcing plate passes through said optical sheet, wherein said optical sheet is a light diffusing optical sheet for increasing the uniformity of luminance of said light-emitting surface of said backlight unit and said light source is arranged immediately below said reinforcing plate and between said reflecting member and said reinforcing plate, and wherein said light source includes a plurality of juxtaposed line-shaped light sources and said reflecting member is constructed with a support plate and a white reflecting plate supported by said support plate.

13. A backlight unit as claimed in claim 12, wherein said transparent reinforcing plate is formed of a material having light transmittance and glass transition temperature higher than those of said optical sheet.

14. A backlight unit as claimed in claim 12, wherein said reinforcing plate is stuck on said optical sheet by a transparent tackiness agent.

15. A backlight unit as claimed in claim 14, wherein said transparent tackiness agent is acrylic tackiness agent.

16. A backlight unit as claimed in claim 12, wherein a base material of said optical sheet is polyester resin and said reinforcing plate is formed of either polyethylene naphthalate resin or polycarbonate.

17. A backlight unit as claimed in claim 12, wherein light transmittance of said reinforcing plate for light from said light source is 90% or more.

18. A backlight unit as claimed in claim 12, wherein glass transition temperature of said reinforcing plate is 100° C. or higher.

* * * * *